United States Patent [19]

Mamolou

[11] Patent Number: 4,676,396
[45] Date of Patent: Jun. 30, 1987

[54] COMBINED FILTER HOUSING AND EXTRACTOR THEREFOR

[76] Inventor: Charles A. Mamolou, 5 Princeton Dr., Bordentown, N.J. 08505

[21] Appl. No.: 786,602

[22] Filed: Oct. 11, 1985

[51] Int. Cl.$^4$ .................. B65H 1/08; A47F 13/06
[52] U.S. Cl. ............................. 221/36; 221/210; 221/259; 221/59; 294/1.1; 294/118
[58] Field of Search ............ 221/37, 40, 210, 213–216, 221/220, 221, 259, 59, 60, 36; 294/118, 1.1, 8.5, 11, 28

[56] References Cited

U.S. PATENT DOCUMENTS

| | | | |
|---|---|---|---|
| 1,472,584 | 10/1923 | Carle | 221/40 |
| 2,362,395 | 11/1944 | Ozdobinski | 294/8.5 X |
| 2,568,413 | 9/1951 | Rubisch | 221/37 |
| 3,826,406 | 7/1974 | Moniot | 221/58 |
| 4,073,530 | 2/1978 | Seidler | 294/1.1 X |
| 4,093,297 | 6/1978 | Reiber | 294/131 X |
| 4,103,884 | 8/1978 | Kawashima | 294/61 X |
| 4,121,726 | 10/1978 | Pemberton | 221/37 |
| 4,214,673 | 7/1980 | Heath et al. | 221/259 |
| 4,269,324 | 5/1981 | Hausam | 221/220 X |
| 4,285,114 | 8/1981 | Underdahl | 294/1.1 X |

FOREIGN PATENT DOCUMENTS

| | | | |
|---|---|---|---|
| 2417688 | 11/1974 | Fed. Rep. of Germany | 221/58 |
| 795924 | 3/1936 | France | 294/118 |

Primary Examiner—F. J. Bartuska
Assistant Examiner—Gregory L. Huson
Attorney, Agent, or Firm—Sachs & Sachs

[57] ABSTRACT

A completely enclosed filter housing capable of storing a plurality of filters therein and a combination cover and an extractor for the stored filters includes a housing and a form fitted cover to seal the housing. An extractor mechanism utilizing cooperating arms is affixed within the cover opening and extends above and below the cover into the housing where semi-adhesive resilient members disposed on one pair of distal ends comes in contact with the stored filters which are urged upwardly by a second resilient member. By applying pressure to the upwardly extending arms the filter is engaged by the semi-adhesive resilient member, and by removing the housing cover a single filter is removed.

16 Claims, 4 Drawing Figures

COMBINED FILTER HOUSING AND EXTRACTOR THEREFOR

BACKGROUND OF THE INVENTION

1. Field of the Invention

The present invention relates to filter housings and, more particularly to an enclosed filter housing and combination extractor mechanism capable of removing individual filters.

2. Discussion of the Relevant Art

The Applicant is not aware of any device utilized for storing generally truncated cone-shaped filters used in the modern day coffee makers such as in the type known as MR. COFFEE, or the like, that is capable of storing a plurality of filters maintaining them essentially dust free and yet dispense a singular filter when required. Many devices such as, for example, tweezers, tongs, and the like have been used and invariably it is a difficult task to retrieve a singular filter from a storage container that contains a plurality of this type of filter.

The apparatus as set forth herein overcomes this shortcoming by providing an enclosed filter housing suitable for storing a plurality of this type of filter, but is not limited to only this type, and provides a cover adapted to seal the housing. Disposed in the housing cover is an extractor mechanism capable of readily removing a singular filter, repeatedly, as required by a user thereof.

Therefore, it is an object of the present invention to provide a filter housing which is capable of storing a plurality of filters and is completely enclosed to prevent dust and debris from accumulating on the filters.

It is a further object of the present invention to provide a relatively inexpensive, attractive, combination filter housing and extractor mechanism that is capable of repeatedly dispensing a single filter as required.

It is still yet another object of the present invention to provide a combination filter housing and extractor mechanism for the filters which is attractive and may also be utilized for the placement of advertising indicia thereon.

It is still yet another object of the present invention to provide a relatively inexpensive filter housing and filter extractor mechanism which is relatively inexpensive and convenient to use.

SUMMARY OF THE INVENTION

A combination filter housing and extractor therefor, according to the principles of the present invention, includes a filter storage housing capable of holding a plurality of paper filters therein. The housing has an open end and a closed end with a resilient device disposed proximate the housing closed end for urging filters placed thereon towards the open end. A cover, adapted to be received by and, cooperate with the housing open end seals the housing. The cover is provided with an opening therein in which is disposed an extractor device. The extractor device extends above and below the cover and includes a pair of arms positioned to form an X and are adapted to cooperate with each other about a pivotal axis which occurs at the intersection of the arms. The pivotal axis is positioned at the top surface of the housing cover. The distal ends of the extractor, extending into the housing, include a resilient semi-adhesive material for contacting the filter members. The other end of each arm is provided with gripping grooves which extend above the cover and are available to the user. By exerting pressure on the gripping grooves, the resilient semi-adhesive material contacts, engages and retains one of the filters stored in the housing and by removing the cover together with the extractor mechanism a singular filter is obtained. A spring biasing device is positioned on the pivotal axis for urging the extractor arms away from each other.

The foregoing and other objects and advantages will appear from the description to follow. In the description reference is made to the accompanying drawing which forms a part hereof, and in which is shown by way of illustration a specific embodiment by which the invention may be practiced. This embodiment will be described in sufficient detail to enable those skilled in the art to practice the invention and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENTS

Figure 1:
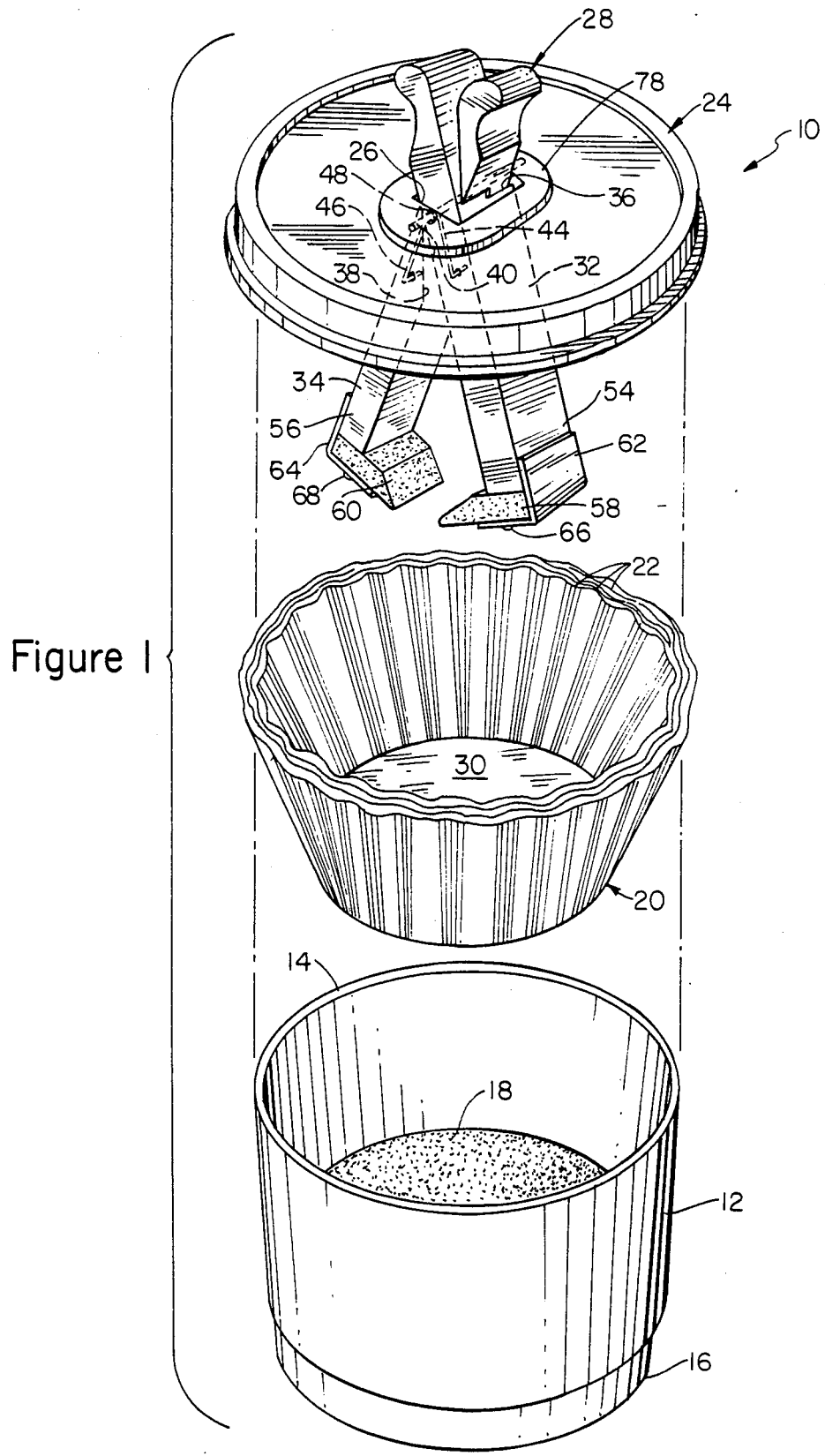
FIG. 1 is an enlarged exploded view of the enclosed filter housing and filter extractor, according to the principles of the present invention.

Referring now to the figures, and in particular to FIG. 1, there is shown a combination filter storage housing and extractor mechanism 10 which includes a generally cylindrically-shaped housing member 12 that has an open end 14 and a closed end 16. Disposed proximate the closed end 16 of the housing 12 is a resilient generally disc-shaped member 18 (preferably made of polyurethane foam or of soft sponge rubber, or the like) upon which rests a plurality of filters 20 that are generally in the shape of an inverted truncated cone. The shape of these filters are well known since they have been utilized in automatic coffee makers for many years. Because of the undulations 22 provided therein due to the necessity of packing them into a small container and the need for them to fit into the cup portion of a coffee maker, not shown, there is severe difficulty in removing one filter from a pack or plurality of filters. An individual generally spends an inordinate amount of time in attempting to separate a single filter from the pack, especially, early in the morning when one's fingers are not apt to be as dexterous as is desirable. Thus, an extractor mechanism such as that disclosed herein, should be readily received by individuals using these types of filters.

The filters 20 may be stored in the housing 12 resting upon the resilient member 18 in amounts equal to the standard packaging for these filters, which generally runs in packs of 50, 100 or 200. Of course, the height would be adjusted to accommodate the various quantities at the time the housing is manufactured. The open end 14 of the housing 12 is designed to receive a cover member 24 thereon in close fitting relationship so that the filters will be completely enclosed within the housing, thus keeping them free from dirt and dust appearing in the atmosphere which may settle thereupon. An opening 26 is provided in the cover member 24. Preferably the opening is rectangularly-shaped and centrally disposed and is adapted to receive the extractor mechanism 28 therein which extends above the cover member 24 and downwardly into the housing member 12 where it comes into contact with the flat portion 30 of the filter 20. The extractor mechanism 28 includes a pair of identical arms 32 and 34 that have angularly disposed slots 36 and 38, respectively, provided therein. The angle of slots 36 and 38 will be described in more detail with respect to FIG. 2.

The arms 32 and 36 are positioned to form an X with a pivotal pin 40 positioned at the central juncture of the arms which are adapted to be readily journaled therearound. A spring member 42, coil shaped with extending arms 44 and 46 extend outwardly from the central coil portion 48 (see FIG. 2) where they are bent at right angles and preferably inserted into apertures 50 and 52 provided on arms 32 and 34, respectively. The spring member 42 is designed so that extending arms 44 and 46 exert pressure on arms 32 and 34 so that both distal ends are moved in an outwardly direction away from each other.

The lower distal ends 54 and 56 of arms 32 and 34, respectively, are provided with semi-adhesive resilient members 58 and 60, respectively, which, in one embodiment, is affixed onto arms 32 and 34 by means of brackets 62 and 64, respectively, which are retained on arms 32 and 34 by the aid of screws 66 and 68 which are received into threaded apertures, 70 and 72 (see FIG. 2) provided in the arms 32 and 34, respectively.

Figure 2:
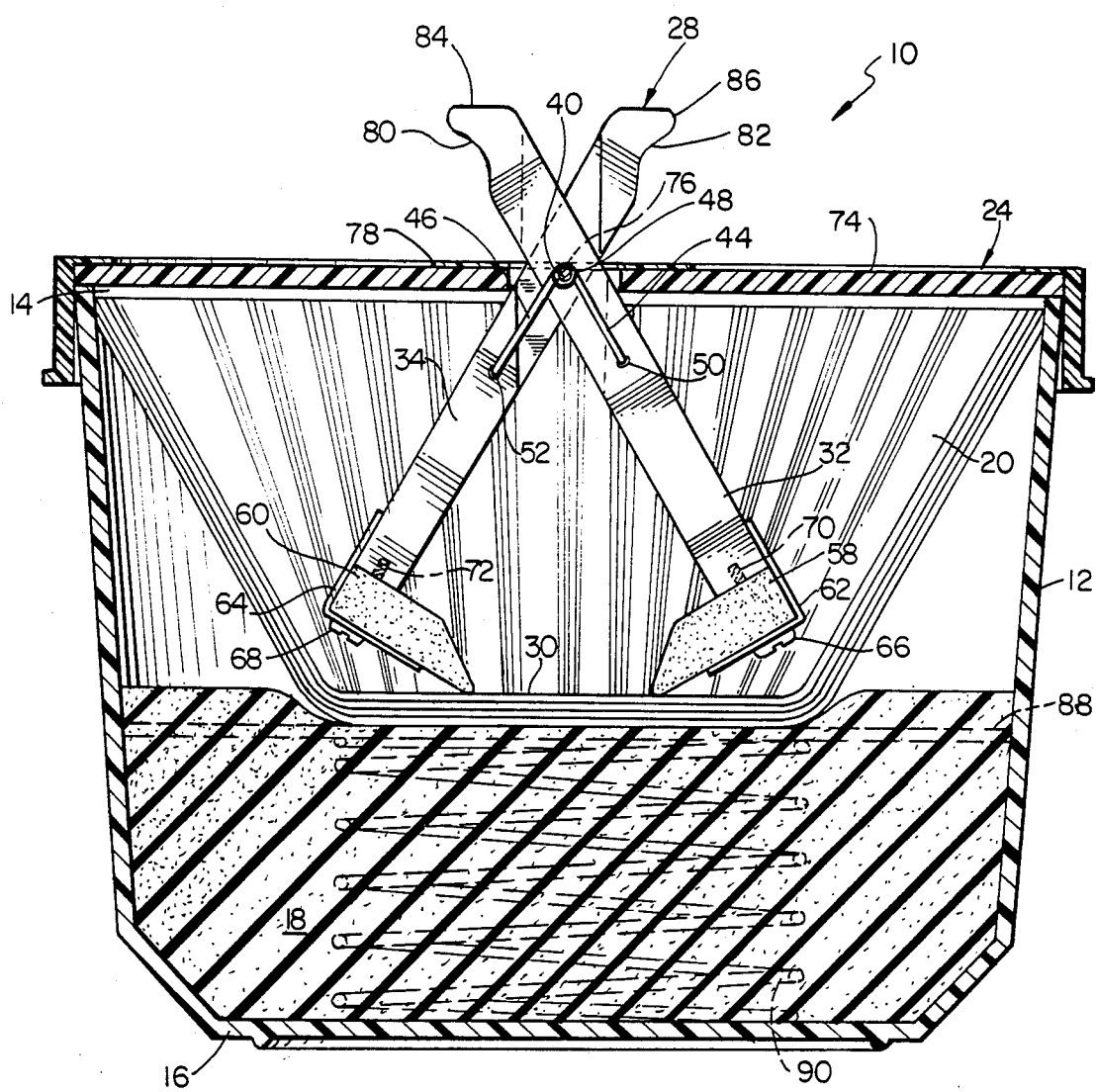
FIG. 2 is an enlarged cross-sectional view of the cover containing the extractor in place upon a filter housing.

Referring now specifically to FIG. 2, there is shown the cover member 24 resting upon the housing 12 completely encompassing the filters 10 and thus, protecting them from dust or other particles in the atmosphere. The pivot pin 40 preferably extends beyond the arm members 32 and 34 and rests upon the top surface 74 of the cover member 24 where it is held in position by a pair of V-notched grooves 76 provided in a retaining member 78 which may be affixed to the top surface 74 of cover member 24 by means of any suitable adhesive, not shown. Thus, the extractor member 28 is affixed to the cover member 24 yet permits journaling of both arm members 32 and 34 when pressure is applied to the upper or gripper portions 80 and 82 provided on the upper distal ends 84 and 86 of arms 32 and 34, respectively. Pressure exerted by an individual upon the gripper portions 80 and 82 will cause the semi-adhesive resilient members 58 and 60 to come together gripping the flat portion 30 of filter member 20 therebetween. Lifting the extractor mechanism 28 together with the cover member 24 up and away from the housing member 12 will cause a single filter member 20 to be removed from and separated from a group of filters stored within the housing 12. The angle of slots 36 and 38 relative to the longitudinal axis of arms 32 and 34 is chosen to limit the maximum opening of distal ends 54 and 56 to the diameter of the flat portion 30 of the filter 20.

Although a resilient member 18 is shown as being fabricated from foam rubber or sponge, it is readily apparent, by those knowledgeable in the art, that a solid platform 88 (shown in broken lines) and a spring 90 (shown in broken lines) disposed therebeneath and in contact with the closed end 16 of the housing 12 may be used to urge the filters in an upwardly direction for cooperation with the resilient members 58 and 60 of the extractor mechanism 28.

Figure 3:
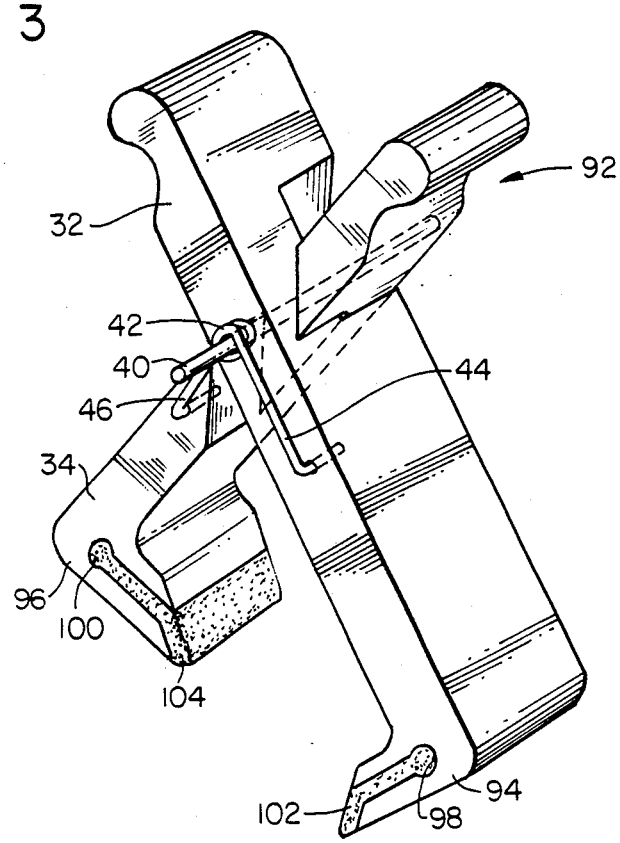
FIG. 3 is a perspective view of another type of extractor device removed from a cover.

Referring now to FIG. 3 which shows an alternate embodiment of the extractor mechanism 92 removed from the cover member 24. In the embodiment disclosed in FIG. 3 the arms 32 and 34 are preferably fabricated from identical unitary assemblies and are provided at the lower distal edges 94 and 96 with key-hole-shaped slots 98 and 100, respectively, into which semi-adhesive resilient members 102 and 104 may be inserted and retained therein and, of course, may be readily replaced when worn out. The remaining portions of the extractor mechanism 92 are fabricated in a manner similar to that discussed with the extractor mechanism 28. Spring member 42 with arms 44 and 46 functioning in the same manner, is also included.

Figure 4:
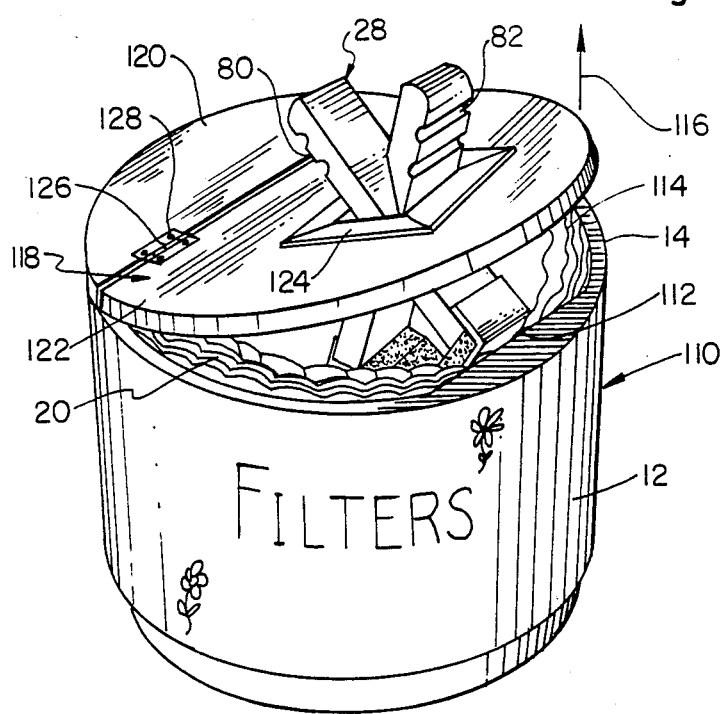
FIG. 4 is a pictorial representation, in perspective, showing an alternate embodiment of an enclosed filter housing and associated extractor.

An alternative embodiment of the filter housing and extractor assembly 110 is shown in FIG. 4 wherein the housing 12 at the open end 14 is provided with a lip portion 112 that is used to retain the edges 114 of the plurality of filters therebeneath when the extractor mechanism 28 is lifted upwardly in the direction of arrow 116 in removing a filter from the housing 12. The cover portion 118 of the alternative embodiment 110 includes a cover 118 that includes a fixed portion 120 which is affixed in suitable manner, such as by adhesive, to the housing 12 and a moveable portion 122 into which the extractor mechanism 28 is affixed, as described in conjunction with FIGS. 1 and 2, by means of a retaining member 124. The fixed portion 120 and the moveable portion 122 of cover member 118 may be joined by hinges 126 by any suitable retaining devices such as screws or rivets 128. Thus, when the moveable cover member 122 is placed on the open end 14 of the housing 12 the filter members 20 are completely enclosed and protected from any dirt or dust in the environment as in the earlier embodiment described.

The outer shape of the housing 12 is not critical and may be made in many different type of designs suitable for display in or on kitchen counter tops or shelves and may include any type of design or indicia thereon, such as floral arrangements or an advertising statement favoring one brand or other of coffee to be used together with the filters. The gripper portions 80 and 82 may be provided with any sort of groove or configuration suitable for receiving pressure applied by an individual's fingers thereacross to make it easy to apply pressure without slipping so that the semi-adhesive resilient members 58 and 60 may engage and retain a single filter member 20.

It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A filter housing and extractor therefor comprises, in combination:

A. filter sorage means capable of holding a plurality of filters therein, said storage means including;

(a) a generally cylindrically-shaped housing means having an open end and a closed end,
(b) resilient means disposed proximate said housing means closed end for receiving said filters thereon,
(c) cover means adapted to be received by and cooperate with said housing means open end for sealing said housing means open end, said cover means being provided with a top surface and a bottom surface and an opening therein; and B. extractor means disposed within said cover means opening extending above and below said cover means, said extractor means including;
(a) a pair of arms positioned to cross at a pivotal axis to form an X and adapted to cooperate with each other about said pivotal axis occurring at the intersection of said arms, said pivotal axis being disposed in the plane of said cover means, said arms including:
(i) resilient semi-adhesive material disposed at one distal end of each of said arms,
(ii) the other distal end of each said arms being provided with gripping means extending above said cover means, a pinching pressure exerted on said gripping means causing each said one distal end disposed below said cover means bottom surface and into said housing means to move towards each other engaging and retaining one of said filters therebetween, and
(iii) spring means disposed on said pivotal axis for urging the distal ends of raid arms away from each other.

2. An enclosed filter housing and extractor according to claim 1 wherein said resilient means includes a shelf in contact with said filters and a spring means disposed therebeneath proximate said housing means closed end.

3. An enclosed filter housing and extractor according to claim 1 wherein said resilient means is formed from a polyurethane foam rubber.

4. An enclosed filter housing and extractor according to claim 1 wherein said spring means distal ends are inserted into apertures provided in said arms.

5. An enclosed filter housing and extractor according to claim 1 wherein said pivotal axis is disposed on said cover means top surface and held in position by a retaining device affixed to said cover top surface.

6. An enclosed filter housing and extractor according to claim 1 wherein said gripping means is provided with curved grooves adapted to receive an individual's fingers when pressure is applied thereto.

7. An enclosed filter housing and extractor according to claim 1 wherein said gripping means is provided with a surface readily responsive to receiving pressure thereon exerted by an individual.

8. An enclosed filter housing and extractor according to claim 1 wherein one distal end of each of said arms is L-shaped and projects towards each other.

9. An enclosed filter housing and extractor according to claim 1 wherein each said arms comprises a unitary structure and further includes means for removably receiving said resilient semi-adhesive material therein.

10. An enclosed filter housing and extractor according to claim 1 wherein said cover means includes first and second portions, said first portion being affixed to said housing means open end, said cover means second portion being hingedly affixed to said cover means first portion, said cover means second portion being provided with said cover means opening.

11. An enclosed filter housing and extractor according to claim 10 further including:
(a) retaining means disposed proximate said housing means open end for retaining the remiaining filters when one is extracted from said housing means.

12. An enclosed filter housing and extractor according to claim 1 wherein said filters are generally shaped as a truncated cone.

13. An enclosed filter housing and extractor according to claim 12, wherein the maximum opening of said pair of arms is limited to the truncated diameter of said filter.

14. An enclosed filter housing and extractor according to claim 1 wherein each said arms are identical.

15. An enclosed filter housing and extractor according to claim 14 wherein said arms are each provided with identical angular slots which are adapted to cooperate with each other in forming said X, said slots having limiting shoulders thereon which limit the maximum opening of said arms.

16. An enclosed filter housing and extractor according to claim 15 wherein the maximum opening of said arms is limited to the diameter of said filter.

* * * * *

UNITED STATES PATENT AND TRADEMARK OFFICE
CERTIFICATE OF CORRECTION

PATENT NO. : 4,676,396

DATED : June 30, 1987

INVENTOR(S) : Charles A. Mamolou

It is certified that error appears in the above-identified patent and that said Letters Patent is hereby corrected as shown below:

In the Specification:

Column 4; line 30; after "cover" insert therefor --member--.

Column 4; line 32; after "in" insert therefor --any--.

In The Claims:

Claim 1, Paragraph B(a)(iii), line 2; delete "raid" and insert therefor --said--.

Signed and Sealed this

Twenty-fourth Day of November, 1987

*Attest:*

DONALD J. QUIGG

*Attesting Officer*  *Commissioner of Patents and Trademarks*